United States Patent [19]

Hass

[11] E Re. 29,228

[45] Reissued May 24, 1977

[54] VEHICLE SAFETY APPARATUS INCLUDING AN INFLATABLE CONFINEMENT

[75] Inventor: David P. Hass, Detroit, Mich.

[73] Assignee: Eaton Corporation, Cleveland, Ohio

[22] Filed: Oct. 14, 1975

[21] Appl. No.: 622,350

Related U.S. Patent Documents

Reissue of:

[64] Patent No.: 3,632,133
Issued: Jan. 4, 1972
Appl. No.: 801,983
Filed: Feb. 25, 1969

U.S. Applications:

[63] Continuation of Ser. No. 234,422, May 4, 1972, abandoned.

[52] U.S. Cl. ..... 280/738
[51] Int. Cl.[2] ..... B60R 21/08
[58] Field of Search ..... 280/150 AB; 244/31-33, 244/138; 417/185, 191; 141/4; 9/323; 98/2; 180/90

[56] References Cited

UNITED STATES PATENTS

| | | | |
|---|---|---|---|
| 2,772,829 | 12/1956 | Crawford et al. | 417/191 |
| 2,859,908 | 11/1958 | Neigel | 417/185 |
| 2,974,912 | 3/1961 | Namsick | 244/138 |
| 3,096,048 | 7/1963 | Yost | 244/31 |
| 3,122,181 | 2/1964 | Hebenstreit et al. | 141/4 |
| 3,128,969 | 4/1964 | Yost | 244/31 X |
| 3,197,234 | 7/1965 | Bertrand | 280/150 AB |
| 3,370,784 | 2/1968 | Day | 417/185 X |
| 3,370,886 | 2/1968 | Frost | 280/150 X |
| 3,425,712 | 2/1969 | Berryman | 280/150 AB |
| 3,525,536 | 8/1970 | Pruneski | 280/150 AB |

FOREIGN PATENTS OR APPLICATIONS

| | | | |
|---|---|---|---|
| 609,624 | 9/1960 | Italy | 280/150 AB |

*Primary Examiner*—Kenneth H. Betts
*Attorney, Agent, or Firm*—Teagno & Toddy

[57] ABSTRACT

An improved safety device for protecting an occupant of a vehicle during an accident includes a confinement which is inflated to an expanded condition to restrain movement of an occupant. To effect inflation of the confinement, a fluid source is actuated to provide a high-velocity fluid stream which cooperates with a nozzle to draw a relatively large volume of air into the confinement.

13 Claims, 5 Drawing Figures

INVENTOR.
DAVID P. HASS
BY
Yount, Flynn & Tarolli
ATTORNEYS

INVENTOR.
DAVID P. HASS

BY

Yount, Flynn & Tarolli
ATTORNEYS

VEHICLE SAFETY APPARATUS INCLUDING AN INFLATABLE CONFINEMENT

Matter enclosed in heavy brackets [ ] appears in the original patent but forms no part of this reissue specification; matter printed in italics indicates the additions made by reissue.

*This application is a reissue of Pat. No. 3,632,133 dated Jan. 4, 1972, Ser. No. 801,983 filed Feb. 25, 1969, and is a continuation of reissue application Ser. No. 234,422 filed May 4, 1972, now abandoned.*

The present invention relates to a safety device for protecting an occupant of a vehicle during a collision, and particularly relates to a safety device which operates to restrain movement of the occupant during a collision.

A known safety device for protecting an occupant of a vehicle during an accident or collision includes a confinement which is inflated by a flow of fluid from a reservoir to expand the confinement. Heretofore, problems have been encountered in using this known safety device due to the relatively large size and weight of a fluid reservoir which contains a sufficient volume of fluid to expand the confinement. These problems of size and weight become particularly acute when the safety device is adapted to protect the driver of a vehicle by mounting the reservoir and confinement on the steering wheel or dashboard of the vehicle.

Accordingly, it is an object of this invention, to provide a relatively lightweight and compact safety device for restraining movement of an occupant of a vehicle during an accident or collision, hereinafter referred to as accident.

Another object of this invention is to provide a new and improved safety device of the type having a confinement which is inflated to restrain movement of an occupant of a vehicle during an accident wherein the confinement is at least partially inflated by drawing air into the confinement.

Another object of this invention is to provide a new and improved safety device of the type having a confinement which is inflated to restrain movement of an occupant of a vehicle during an accident wherein the confinement is inflated by a large volume of air which is drawn into the confinement by a fluid source.

Another object of this invention is to provide a new and improved safety device of the type having a confinement which is expanded to protect an occupant of a vehicle during an accident wherein the safety device includes a source of a relatively small volume of fluid which is activated upon the occurrence of an accident to provide a high-velocity stream of fluid, the high-velocity stream of fluid cooperating with a nozzle to draw a relatively large volume of air into the confinement to thereby effect expansion of the confinement.

Another object of this invention is to provide a new and improved safety device for protecting an occupant of a vehicle during an accident wherein the safety device includes a gas generator for supplying gas to at least partially inflate a confinement and conduit means connecting the confinement in fluid communication with the atmosphere so that the confinement can be deflated without exhausting gas into the passenger compartment of the vehicle.

Another object of this invention is to provide a new and improved safety device in accordance with any of the preceding paragraphs wherein the safety device is adapted to be mounted on the steering wheel of a vehicle to protect the driver of the vehicle.

These and other objects and features of the invention will become more apparent upon a consideration of the following description taken in connection with the accompanying drawings wherein.

Figure 2:
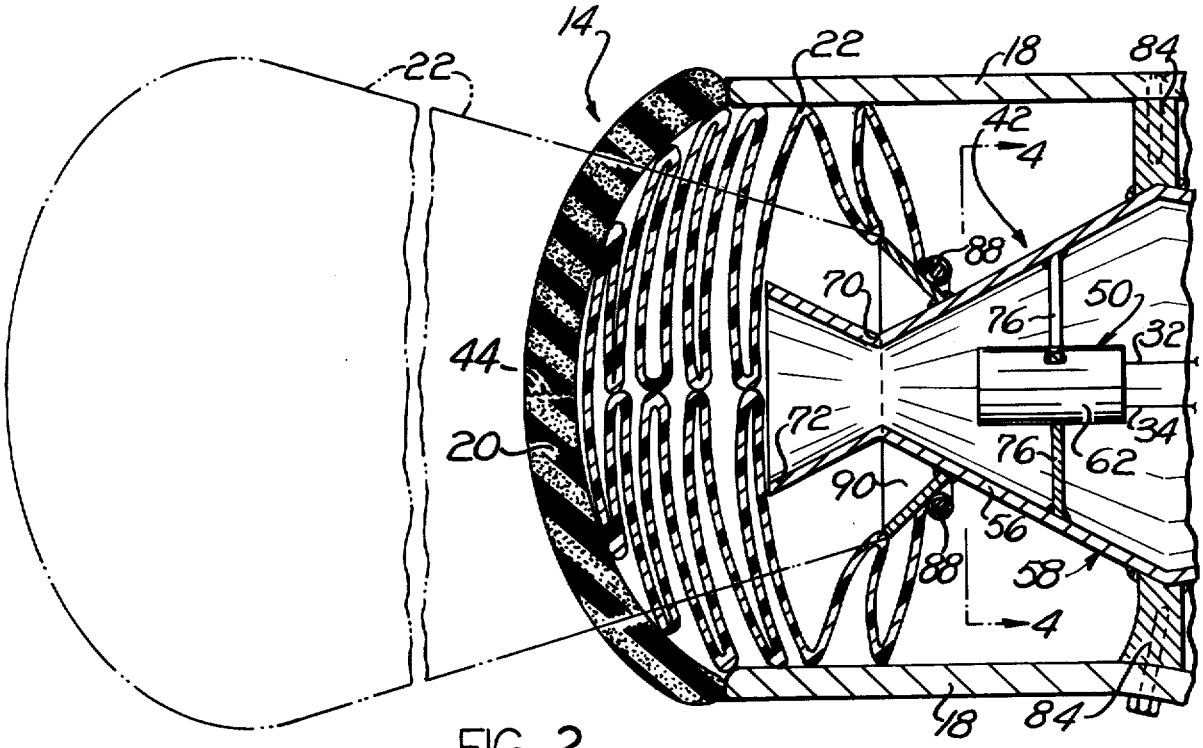
FIG. 2 is an enlarged schematic illustration showing a confinement of the safety device of FIG. 1 in a collapsed condition.
Figure 3:
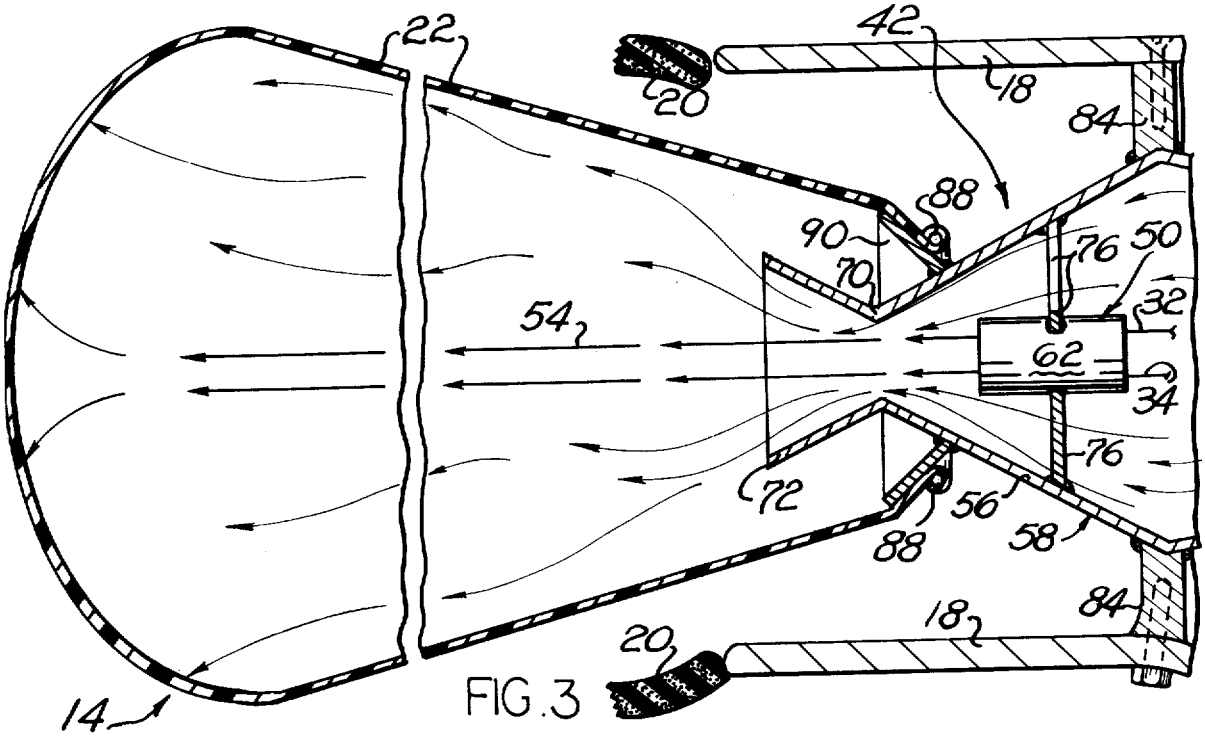
FIG. 3 is an enlarged schematic illustration of the safety device of FIG. 1, the confinement being shown in an expanded condition.
Figure 4:
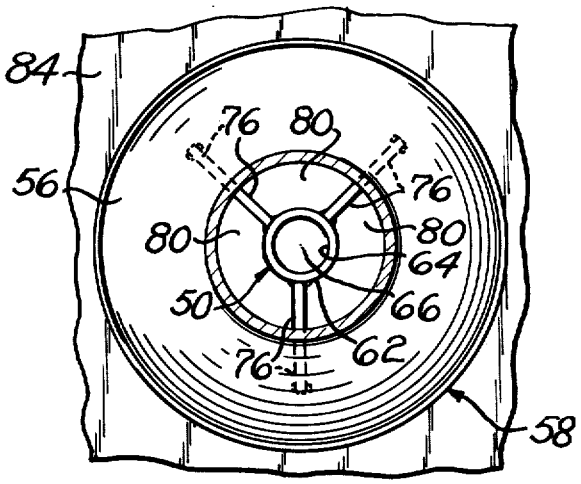
Figure 5:
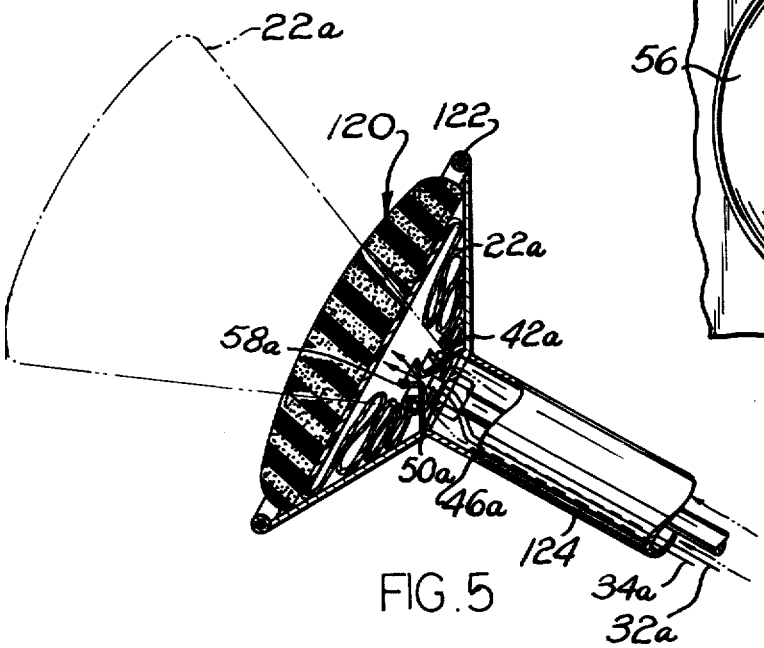

FIG. 4 is a schematic sectional view, taken along the line 4—4 of FIG. 2, illustrating the mounting of the gas generator for supplying gas to effect inflation of the confinement from the collapsed condition of FIG. 2 to the expanded condition of FIG. 3; and FIG. 5 is a schematic illustration of an embodiment of the invention which is mounted on the steering wheel of a vehicle to protect a driver of the vehicle during an accident.

The present invention provides a compact and lightweight safety device having a confinement which is inflated to an expanded condition to protect an occupant of a vehicle during an accident. The confinement is inflated under the combined influence of a high-velocity stream of fluid from a source of fluid and a relatively large volume of air which is drawn into the confinement by the high-velocity stream of fluid. In the illustrated embodiment of the invention, the source of fluid is a gas generator of the solid-propellant rocket motor type. The gas generator provides a high-velocity stream of hot gas which cooperates with a nozzle to draw the large volume of air into the confinement. The hot gas is cooled by the large volume of air so that the confinement is not heated to excessive temperatures by the hot gas.

Figure 1:
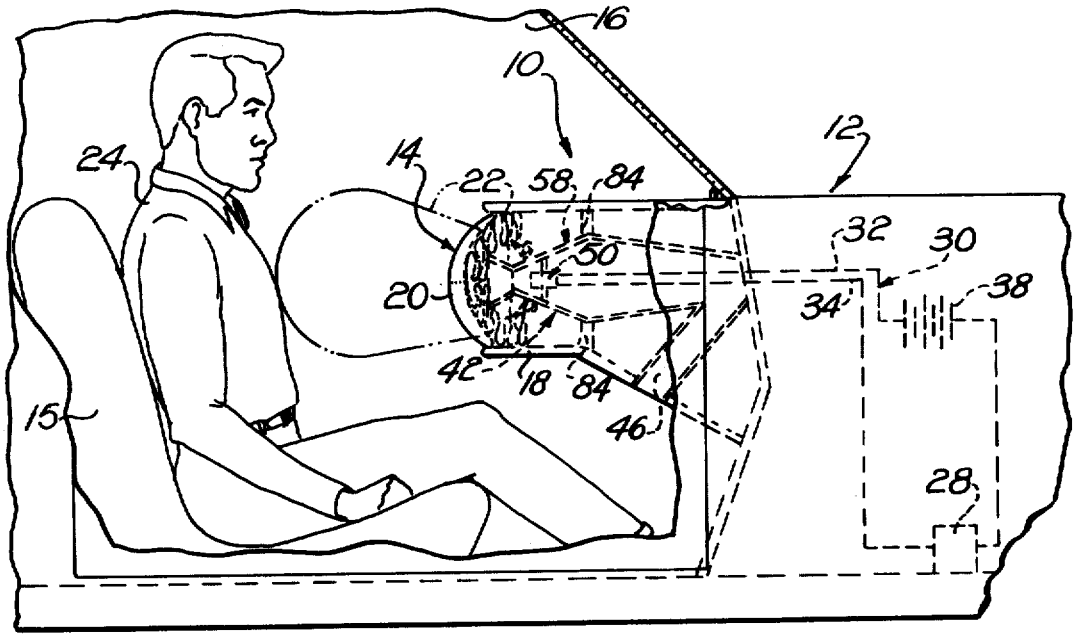
FIG. 1 is a schematic illustration of a vehicle wherein there is mounted a safety device constructed in accordance with the present invention.

Although a safety apparatus 10 constructed in accordance with the present invention can be used to protect the occupants of many different types of vehicles, such as trucks, tractors, boats, and airplanes, the safety apparatus 10 is illustrated in FIG. 1 in connection with an automotive vehicle 12. The safety apparatus 10 includes a safety device 14 which can be mounted in many different locations in the passenger compartment 16 of the vehicle 12. In the illustrated embodiment, the safety apparatus 10 is mounted on a dashboard 18 having a pad 20. The safety device 14 includes a confinement 22 which is inflated from a collapsed condition, shown in FIGS. 1 and 2, to an expanded condition, shown in dashed lines in FIG. 1 and solid lines in FIG. 3, to protect an occupant 24 of the vehicle during an accident.

A known sensor assembly 28 (FIG. 1) is provided for detecting the occurrence of an accident and activating the safety device 14 so that the confinement 22 is inflated to restrain movement of the occupant 24 during the accident. To this end, the sensor assembly 28 is connected with the safety device 14 by electrical circuitry 30 which includes leads 32 and 34. The leads 32 and 34 are energized by a battery 38 upon operation of the sensor assembly 28 to activate an inflation assembly 42 and inflate the confinement 22. Upon initiation of the inflation of the confinement 22, the dashboard pad 20 is ruptured at a weakened section 44 (FIG. 2) by expansion of the confinement. Once inflated, the confinement 22 restrains movement of the occupant 24 to thereby protect the occupant in a known manner during the accident.

In order to minimize both the size and weight of the inflation assembly 42, the inflation assembly inflates the confinement 22 by drawing a relatively large volume of air into the confinement from the atmosphere around the safety device 14. In the present embodiment of the invention, this air for inflating the confinement 22 is drawn from the atmosphere within the vehicle 12 through a conduit assembly 46 by operation of a source of fluid 50. Although many different types of fluid sources could be used, the source of fluid 50 is advantageously a gas generator of the solid-propellant rocket motor type. Such a rocket motor type, gas generator 50, has the advantages of being compact and lightweight.

Upon the occurrence of an accident, the gas generator 50 is activated or ignited to provide a stream of high-velocity gas (indicated schematically at 54 in FIG. 3). The high-velocity gas stream 54 is directed into a converging end portion 56 of a converging-diverging nozzle 58. The high-velocity gas stream 54 and nozzle 58 cooperate in a known manner to draw a relatively large volume of air, through the conduit assembly 46 and nozzle 58, into confinement 22. Thus, the confinement 22 is inflated by the combined influence of the gas from the generator 50 and the influence of air drawn into the confinement by the high-velocity stream of gas 54. It should be noted that a relatively large volume of gas, from four to five times as large as the volume of gas provided by the gas generator 50, is drawn into the confinement by the flow of the high-velocity stream 54 of gas through the nozzle 58. Since air is drawn into the confinement 22 from the passenger compartment 16, the change in pressure within the passenger compartment upon expansion of the confinement is minimized. In addition, the noise generated by inflating the confinement 22 is minimized since the pressure waves caused by expanding the confinement tend to be diminished by the flow of air into the confinement from the vehicle compartment.

The gas generator 50 includes a casing or housing 62 (see FIG. 4) defining a combustion chamber 64 in which a solid propellant or fuel 66 is located. Upon ignition of the fuel 66 by energization of the leads 32 and 34 (FIG. 3), the fuel burns and generates a hot gas which flows out of the casing 62 in a high velocity stream 54 (see FIG. 3). This high-velocity stream 54 of hot gas is directed into the throat portion 70 of the nozzle 58 so as to draw air from the conduit assembly 46 into the nozzle. The gas and air then flow in a combined stream through the diverging end portion 72 of the nozzle and into the interior of the confinement 22 in a manner illustrated schematically in FIG. 3. The flow of a high-velocity stream 54 of gas through the center of the nozzle 58 is promoted by mounting the gas generator 50 on struts or support members 76 which extend radially outwardly from the casing 62 (see FIG. 4) and are fixedly connected to the converging end portion 56 of the nozzle. Of course, sources of a high-velocity stream of fluid other than a gas generator could be used.

The burning of the solid propellant or fuel 66 in the combustion chamber 64 generates a stream of hot gas. To prevent an overheating of the confinement 22 and the nozzle 58, the hot gas from the generator 50 is cooled by the air which is drawn from outside the safety device 14 into the confinement 22 by the high-velocity stream of gas 54. To provide for an even cooling of the hot gas from the gas generator 50, the gas generator is mounted along a central axis of the nozzle 58 so that the air will flow around the gas generator 50 through openings 80 (see FIG. 4) between the struts 76 and cool the hot gas as it flows through the throat 70 of the nozzle. It should be noted that this flow of air also tends to cool the gas generator 50 and support wall 84 to which the nozzle 58 is fixedly secured.

Upon deflation of the confinement 22 from the expanded condition of FIG. 3 toward the collapsed condition of FIG. 2, the gas and air in the confinement is exhausted to the interior of the vehicle 12. The confinement 22 is continuously connected in fluid communication with the interior of the vehicle 12 by the conduit assembly 46. This continuous fluid communication enables the gas in the confinement 22 to be exhausted back into the interior of the vehicle as the confinement deflates. Of course, the conduit assembly 46 also functions to enable air to be drawn into the confinement 22 in the manner previously explained.

The confinement may be made of a fluidtight material so that gas cannot seep through the walls of the confinement when it is in the expanded condition of FIG. 3. A fluidtight seal assembly 88 is provided for securely attaching the confinement to an outwardly flaring annular rim 90 connected to the nozzle 58 to prevent leakage of fluid between the rim 90 and an innermost end portion of the confinement 22.

The embodiment of the invention illustrated in FIG. 5 includes a safety device 120 which is adapted to protect the driver of a vehicle. To this end, the safety device 120 is mounted on a steering wheel 122 of a vehicle for rotation therewith relative to a steering column or steering wheel support assembly 124. The safety device 120 is constructed in substantially the same manner as the safety device 14 and operates in a similar manner to protect the driver of a vehicle during a collision. Therefore, the same numerals will be used to designate parts of the safety device 120 as were previously used to designate similar parts of the safety device 14, the suffix letter "a" being added to the numerals designating the parts of the safety device 120 to avoid confusion.

The safety device 120 includes a confinement 22a which is inflated from a collapsed condition, shown in solid lines in FIG. 5, to an expanded condition, shown in dashed lines, to restrain movement of the driver of the vehicle during a collision. To provide for this inflation of the confinement 22a, the safety device 120 includes an inflation assembly 42a which is activated by energization of leads 32a and 34a. Energization of the leads 32a and 34a activates a source of fluid, in the present instance, a gas generator 50a of the solid-propellant rocket motor type, to provide a stream of high-velocity gas. This stream of high-velocity gas is directed through a nozzle 58a to draw air into the confinement in a manner similar to that previously explained in connection with the confinement 22 of the embodiment of the invention illustrated in FIGS. 1–3. In the embodiment of the invention illustrated in FIG. 5, this air is drawn from outside of the vehicle through a conduit assembly 46a which extends through the steering column 124 and is connected in fluid communication with the interior of the confinement 22a through the nozzle 58a. The high-velocity stream of gas from the gas generator 50a is effective to draw a volume of air through the conduit 46a which is approximately four to five times as great as the volume of gas provided by the generator.

The gas from the confinement 22a is exhausted to the atmosphere outside of the vehicle upon a deflation of the confinement from an expanded condition indicated in dashed lines in FIG. 5 toward the collapsed condition. Thus, when the confinement 22a is collapsed or deflated, gas in the confinement is exhausted through the conduit 46a to the outside of the vehicle. Of course, if desired, the conduit 46a could be connected in such a manner as to conduct air from the passenger compartment to the confinement 22a upon expansion of the confinement. Such an arrangement would tend to minimize pressure disturbances and noise generation within the passenger compartment, as in the embodiment of FIG. 1. Likewise, the embodiment of FIG. 1 could also operate to draw air from outside the vehicle.

Due to its lightweight and relatively compact size, the safety device 120 is particularly well adapted for mounting on the steering wheel 122 to protect the driver of the vehicle. The compact size of the safety device 120 results from the use of the inflation assembly 42a to draw air from outside of the safety device into the confinement 22a when the confinement is inflated from the collapsed condition of FIG. 5 to the expanded condition. In addition, the size of the safety device 120 is minimized by the use of a solid-propellant rocket motor type gas generator 50a to provide the high-velocity stream of gas for effecting inflation of the confinement 22a.

In view of the foregoing description it can be seen that the safety devices 14 and 120 are relatively compact and lightweight. This compactness and lightweight results from the use of fluid provided by the gas generators 50 and 52a and air from outside of the safety devices to inflate the confinements 22 and 22a. In order to draw air into the confinements 22 and 22a, the rocket motor type gas generators 50 and 50a provide high-velocity streams of gas which are directed into their respective associated nozzles 58 and 58a. The nozzles 58 and 58a cooperate in a known manner with the high-velocity gas streams to draw air into the confinements 22 and 22a. In addition to inflating the confinements 22 and 22a, the air drawn into the confinements serves to cool the relatively hot gas from the rocket motor type gas generators 50 and 50a.

I claim:

[1. A safety device for protecting an occupant of a vehicle during a collision, said safety device including a confinement which is expansible from a collapsed inoperative condition to an expanded operative condition in which said confinement is adapted to restrain movement of the occupant of the vehicle during a collision, and means for generating one volume of gas and directing it into said confinement and for effecting a flow of a larger volume of air into said confinement to inflate said confinement from said collapsed condition to said expanded condition.]

[2. A safety device as set forth in claim 1 further including conduit means for continuously connecting said confinement in fluid communication with the atmosphere inside of the vehicle to thereby enable said larger volume of air to be drawn from within the vehicle upon expansion of said confinement.]

3. A safety device [as set forth in claim 1] *for protecting an occupant of a vehicle during a collision, said safety device including a confinement which is expansible from a collapsed inoperative condition to an expanded operative condition in which said confinement is adapted to restrain movement of the occupant of the vehicle during a collision, and means for generating one volume of gas and directing it into said confinement and for effecting a flow of larger volume of air into said confinement for admixing with said first volume to inflate said confinement from said collapsed condition to said expanded condition*, wherein said means for generating said one volume of gas includes a solid-propellant rocket-type device which is at least partially cooled by the flow of said larger volume of air into said confinement.

4. A safety device [as set forth in claim 1] *for protecting an occupant of a vehicle during a collision, said safety device including a confinement which is expansible from a collapsed inoperative condition to an expanded operative condition, in which said confinement is adapted to restrain movement of the occupant of the vehicle during a collision, and means for generating one volume of gas and directing it into said confinement and for effecting a flow of a larger volume of air into said confinement for admixing with said first volume to inflate said confinement from said collapsed condition to said expanded condition*, wherein said confinement and said means for generating one volume of gas *and* directing it into said confinement are mounted on the steering wheel of the vehicle for rotation therewith relative to a steering wheel support assembly.

[ 5. A safety device as set forth in claim 1 wherein said larger volume of air is at least four times greater than said one volume of gas. ]

6. A safety device [ as set forth in claim 1 ] *for protecting an occupant of a vehicle during a collision, said safety device comprising a confinement which is expansible from a collapsed inoperative condition to an expanded operative condition in which said confinement is adapted to restrain movement of the occupant during a collision, and means for generating one volume of gas and directing it into said confinement for admixing with said first volume to inflate said confinement from said collapsed condition to said expanded condition*, wherein said means for generating said one volume of gas includes a nozzle for directing said one volume of gas and said larger volume of air into said confinement and a gas generator having a combustion chamber in which fuel is burned to thereby generate said one volume of gas, said gas generator being mounted in a coaxial relationship with said nozzle to enable said gas generator to be at least partially cooled by a flow of said larger volume of air around said gas generator.

7. A safety device as set forth in claim 6 wherein said confinement is made of a fluidtight material and is sealingly connected to said nozzle to prevent an escape of gas from said confinement into the passenger compartment of the vehicle.

[ 8. A safety device for protecting an occupant of a vehicle during a collision, said safety device comprising a confinement which is expansible from a collapsed inoperative condition to an expanded operative condition in which said confinement is adapted to restrain movement of the occupant during a collision, and means for drawing air into said confinement to expand said confinement to said expanded condition including a nozzle connected in fluid communication with a source of air and having one end portion opening into said confinement and a gas-generating assembly for directing a stream of high-velocity gas into said nozzle. ]

9. A safety device [ as set forth in claim 8 ] *for protecting an occupant of a vehicle during a collision, said safety device comprising a confinement which is expansible from a collapsed inoperative condition to an expanded operative condition in which said confinement is adapted to restrain movement of the occupant during a collision, and means for drawing air into said confinement to expand said confinement to said condition including a nozzle connected in fluid communication with the atmosphere in the vehicle occupant compartment and having one end portion opening into said confinement and a gas generating assembly for directing a stream of high velocity gas into said nozzle*, wherein said gas generating assembly is located in the path of the air to enable the air to at least partially cool the gas generated by said generating assembly.

[ 10. A safety device for protecting an occupant of a vehicle during a collision, said safety device comprising a confinement which is expansible from a collapsed inoperative condition to an expanded operative condition in which said confinement is adapted to restrain movement of the occupant during a collision, means for drawing air into said confinement to expand said confinement to said expanded condition, and passage means for connecting said confinement in fluid communication with the atmosphere outside of the safety device to enable air to be drawn through said passage means and into said confinement and to enable gas to be exhausted from said confinement to the atmosphere of the safety device. ]

11. A safety device for protecting an occupant of a vehicle during a collision, said safety device comprising a confinement which is expansible from a collapsed inoperative condition to an expanded operative condition in which said confinement is adapted to restrain movement of the occupant during a collision, and means for drawing air into said confinement to expand said confinement to said expanded condition including a nozzle opening into said confinement and a rocket motor fixedly connected to the vehicle and positioned to direct a high-velocity stream of gas into said nozzle.

12. A safety device as set forth in claim 11 further including means for sealingly connecting said confinement with said nozzle to prevent an escape of gas from said confinement into the passenger compartment of the vehicle.

13. A safety device for protecting an occupant of a vehicle during a collision, said safety device comprising a confinement which is expansible from a collapsed inoperative condition to an expanded operative condition in which said confinement is adapted to restrain movement of the occupant during a collision, and means for drawing air into said confinement to expand said confinement to said expanded condition, and wherein said confinement and means for drawing air into said confinement are mounted on a steering wheel of the vehicle for rotation therewith relative to a steering wheel support assembly.

[ 14. A safety device for protecting an occupant of a vehicle during a collision, said safety device comprising a confinement which is expansible from a collapsed inoperative condition to an expanded operative condition in which said confinement is adapted to restrain movement of the occupant during a collision, and means for drawing air into said confinement to expand said confinement to said expanded condition including a source of fluid for providing a volume of fluid which is substantially smaller than the volume of air drawn into said confinement. ]

15. A safety device for protecting an occupant of a vehicle during a collision, said safety device comprising a confinement which is expansible from a collapsed condition to an expanded condition in which said confinement is adapted to restrain movement of the occupant during a collision, means for expanding said confinement from said collapsed condition to said expanded condition by effecting a flow of air from the atmosphere outside of said confinement into said confinement, and fluid passage means for continuously connecting the interior of said confinement with the atmosphere outside of the vehicle to enable said confinement to be deflated from the expanded condition without exhausting gas into the passenger compartment.

[ 16. A safety device for protecting an occupant of a vehicle during a collision, said safety device comprising a confinement which is expansible from a collapsed condition to an expanded condition in which said confinement is adapted to restrain movement of the occupant during a collision, means for expanding said confinement from said collapsed condition to said expanded condition by effecting a flow of air from the atmosphere outside of said confinement into said confinement including a gas generator which burns fuel to form a gas which flows into said confinement, and fluid passage means for continuously connecting the interior of said confinement with the atmosphere outside of said confinement to enable said confinement to be deflated from the expanded condition to the collapsed condition by flowing gas through said passage means to the atmosphere outside of said confinement. ]

17. A safety device [ as set forth in claim 16 ] *for protecting an occupant of a vehicle during a collision, said safety device comprising a confinement which is expansible from a collapsed condition to an expanded condition in which said confinement is adapted to restrain movement of the occupant during a collision, means for expanding said confinement from said collapsed condition to said expanded condition by effecting a flow of air from the vehicle occupant compartment outside of said confinement into said confinement including a gas generator which burns fuel to form a gas which flows into said confinement, and fluid passage means for connecting the interior of said confinement with the vehicle occupant compartment atmosphere outside of said confinement to enable said confinement to be deflated from the expanded condition to the collapsed condition by flowing gas through said passage means to the vehicle compartment atmosphere outside of said confinement*, wherein said confinement and gas generator are mounted on the steering wheel of the vehicle for rotation therewith relative to a steering wheel support assembly.

[ 18. A safety device for protecting an occupant of a vehicle during a collision, said safety device comprising a confinement which is expansible from a collapsed condition to an expanded condition in which said confinement is adapted to restrain movement of the occupant during a collision, means for expanding said confinement from said collapsed condition to said expanded condition by effecting a flow of air from the atmosphere outside of said confinement into said confinement, and fluid passage means for continuously connecting the interior of said confinement with the atmosphere inside of said vehicle to enable air from the interior of the vehicle to flow into said confinement during expansion thereof to thereby tend to minimize the variation in fluid pressure within the passenger compartment during expansion of said confinement and to enable said confinement to be deflated from the expanded condition to the collapsed condition by flowing gas through said passage means to the atmosphere outside of said confinement. ]

*19. A safety device for protecting an occupant of a passenger compartment of a vehicle during a collision, said safety device comprising a confinement which is expansible from a collapsed inoperative condition to an expanded operative condition in which said confinement is adapted to restrain movement of the occupant during a collision, and means for supplying inflating fluid to the confinement including means for drawing air into said confinement from the interior of said passenger compartment wherein said fluid and said air are admixed to expand said confinement to said expanded condition, and wherein said confinement and means for drawing air into said confinement are mounted on a steering wheel of the vehicle for rotation therewith relative to a steering wheel support assembly.*

*20. A safety device for protecting an occupant of a vehicle during a collision, said safety device comprising:*

*(a) a confinement which is expansible from a collapsed condition to an expanded condition in which said confinement is adapted to restrain movement of the occupant during a collision;*

*(b) means for expanding said confinement from said collapsed condition to said expanded condition including a gas generator which burns fuel to form a gas which flows into said confinement;*

*(c) means for effecting a flow of air from the vehicle occupant compartment into said confinement and mixing same with the generated gas during expansion thereof for minimizing the pressure variation in the occupant compartment, said means including means defining a passage connecting the interior of said confinement with the vehicle occupant compartment atmosphere outside of said confinement, said passage enabling said confinement to be inflated by drawing air from the occupant compartment and deflated from the expanded condition by exhausting the gas and air mixture through said passage to the vehicle occupant compartment;*

*(d) said gas generator and said means effecting said flow of air are disposed as an integral unit mounted in the dash of the vehicle for inflating a confinement to protect passengers adjacent the vehicle driver and said passage defining means communicates with the occupant compartment in the region bounded by the vehicle dash structure.*

*21. The safety device defined in claim 20 wherein said means effecting a flow of air includes means directing fluid flow into said confinement, said fluid directing means having the margins of said confinement attached thereto in fluid-sealing arrangement and said confinement in the collapsed condition is disposed in closely packed arrangement adjacent said fluid directing means.*

* * * * *

UNITED STATES PATENT AND TRADEMARK OFFICE

CERTIFICATE OF CORRECTION

PATENT NO. : RE. 29,228

DATED : May 24, 1977

INVENTOR(S) David P. Hass

It is certified that error appears in the above-identified patent and that said Letters Patent are hereby corrected as shown below:

Col. 5, line 41: "52a" should read "50a".

Col. 7, line 35: before "of the" insert---outside---.

Signed and Sealed this

*Thirteenth* Day of *September 1977*

[SEAL]

*Attest:*

RUTH C. MASON
*Attesting Officer*

LUTRELLE F. PARKER
*Acting Commissioner of Patents and Trademarks*